United States Patent [19]
Eaton

[11] Patent Number: 5,886,645
[45] Date of Patent: *Mar. 23, 1999

[54] METHOD AND APPARATUS FOR PROVIDING DUPLICATE MESSAGES IN AN ACKNOWLEDGE-BACK COMMUNICATION SYSTEM

[75] Inventor: Eric T. Eaton, Lake Worth, Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 562,616

[22] Filed: Nov. 24, 1995

[51] Int. Cl.$^6$ .............................. H04J 15/00; H04J 1/16; G08B 5/22; H04B 7/00
[52] U.S. Cl. ................... 340/825.44; 370/312; 370/313; 340/825.54; 455/38.1; 455/38.2
[58] Field of Search ...................................... 370/312, 313, 370/314; 371/32, 33; 340/825.44, 825.54, 825.69, 825.72; 455/38.1, 38.2

[56] References Cited

U.S. PATENT DOCUMENTS

| | | | |
|---|---|---|---|
| 4,888,767 | 12/1989 | Furuya et al. | 370/95.2 |
| 4,905,234 | 2/1990 | Childress et al. | 370/94.1 |
| 4,914,649 | 4/1990 | Schwandeman et al. | 370/50 |
| 4,928,096 | 5/1990 | Leonardo et al. | 340/825.44 |
| 5,150,110 | 9/1992 | Breechen | 340/825.44 |
| 5,311,516 | 5/1994 | Kuznicki et al. | 370/94.1 |
| 5,485,463 | 1/1996 | Godoroja | 370/95.1 |
| 5,546,394 | 8/1996 | Eaton et al. | 370/79 |

OTHER PUBLICATIONS

Flex–TD Radio Paging Systems Arib Standard, Jun. 27, 1995.

*Primary Examiner*—Brian Zimmerman
*Assistant Examiner*—Anthony A. Asongwed
*Attorney, Agent, or Firm*—Eduardo Guntin

[57] ABSTRACT

A communication system (100) for providing information includes transceivers (110) for receiving the information and acknowledging reception of the information and a terminal (105) for transmitting the information to the transceivers (100). The terminal (105) transmits a first frame of data that has been queued with first information for reception by recipient time diversity transceivers. When at least one acknowledgment is received from at least one recipient time diversity transceiver, a second frame of data with second information intended for reception by the recipient time diversity transceivers is batched. The second information duplicates at least some of the first information and excludes portions of the first information indicated by the at least one acknowledgment. A controller (165) then queues third information into available words of the second frame after the second information has been batched.

26 Claims, 13 Drawing Sheets

| FRAME X | | |
|---|---|---|
| SYNC | NEW FRAME X INFORMATION (44 WORDS) | DUPLICATE INFORMATION OF FRAME X-1 (44 WORDS) |

| FRAME X+1 | | |
|---|---|---|
| SYNC | NEW FRAME X+1 INFORMATION (44 WORDS) | DUPLICATE INFORMATION OF FRAME X (44 WORDS) |

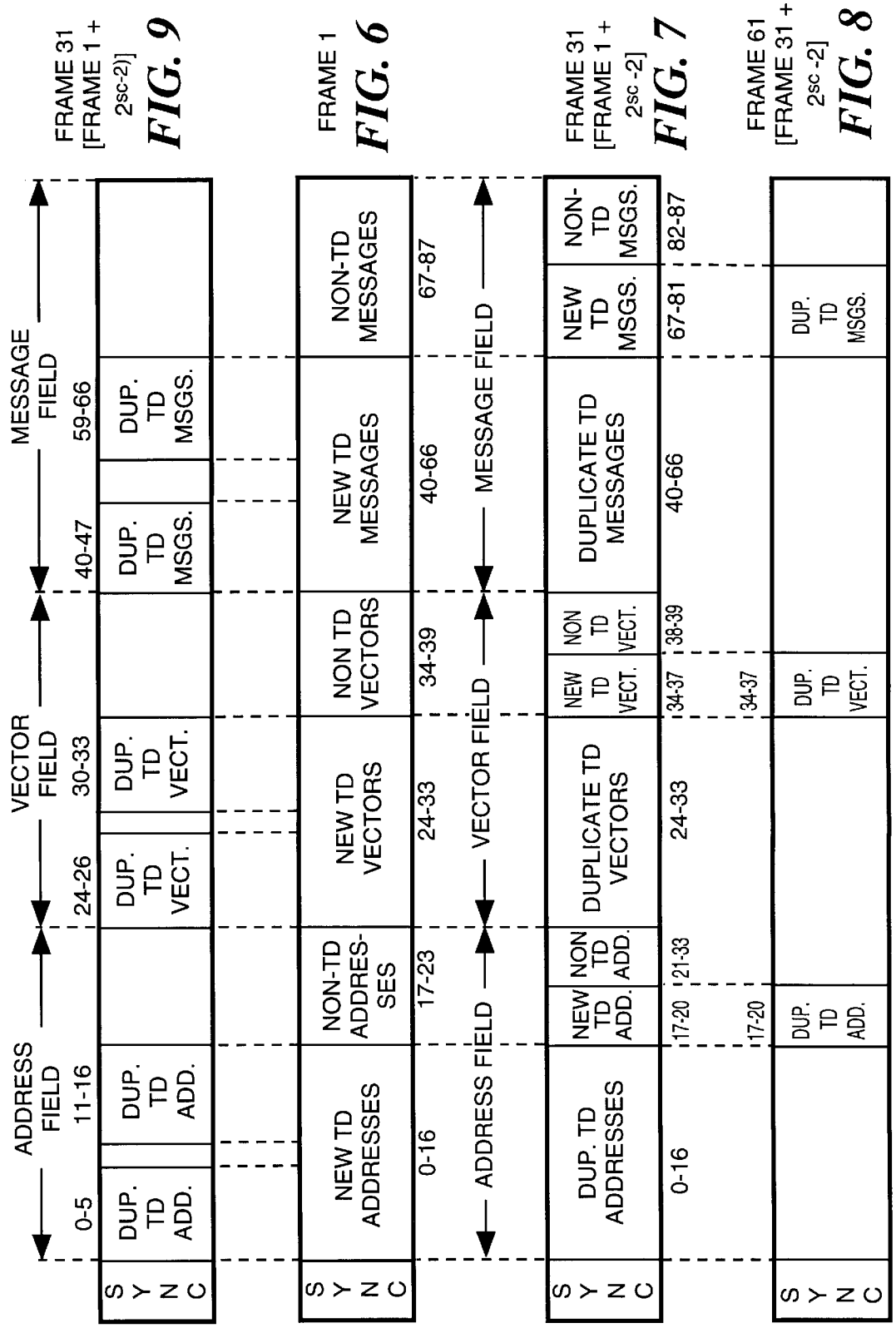

METHOD AND APPARATUS FOR PROVIDING DUPLICATE MESSAGES IN AN ACKNOWLEDGE-BACK COMMUNICATION SYSTEM

FIELD OF THE INVENTION

This invention relates in general to acknowledge-back communication systems, and more specifically to a method and apparatus for providing duplicate messages in an acknowledge-back communication system.

BACKGROUND OF THE INVENTION

Radio communication systems generally include a message transmission device, such as a base station, for encoding messages using a signalling protocol such as FLEX™. The encoded messages are then transmitted as a radio signal to portable devices, such as paging receivers or transceivers. To increase the probability that a pager receives an error-free message, some systems employ "time diversity", e.g., the transmission of duplicate messages.

Conventionally, different types of TD systems exist. Some TD systems involve the reception of duplicate messages by a pager, which then determines which of the received messages includes the fewest number of errors. The least erroneous message is stored and displayed to the user. Other systems provide for codeword combining, in which error-free codewords of messages and perhaps even addresses are selected from each of the plurality of transmissions then recombined to form a correct message in its entirety. Bit combination time diversity (BCTD) is the most accurate TD method. When BCTD is utilized, the pager receives duplicate transmissions and selects therefrom correct bits from each of the transmissions. The selected bits are then recombined to form a complete, error-free message. The drawback of BCTD is that each duplicate transmission must be located in a predetermined signal location so that the pager can calculate, such as from a fixed reference point, the exact locations of the bits of the duplicate transmissions.

In one BCTD system that employs the FLEX™ signalling protocol, the number of words in each frame is divided evenly according to the number of duplicate transmissions. In the conventional FLEX™ protocol, the radio signal is divided into cycles of one-hundred-twenty-eight (128) frames, each including a predetermined synchronization pattern (sync) and a plurality of words. When the radio signal is to be transmitted at 1600 bits per second, for example, eighty-eight words are included in each FLEX™ frame. These eighty-eight words are usually divided into an address field, which includes addresses of pagers to which messages are being transmitted, a vector field following the address field, and a message field. Some addresses, such as those referring to numeric or alphanumeric messages, refer to a vector contained in the vector field, which specifies an area within the message field wherein a corresponding message is located.

In a BCTD system, when a message is to be transmitted two times, for instance, each frame is divided into two segments of forty-four words that follow the sync pattern. New message information is provided in the first forty-four word segment of each frame, while duplicate information from the preceding frame is always transmitted in the second forty-four word segment of each frame, as depicted in the signal diagrams of FIGS. 1 and 2. In FIG. 1, new information is provided in the first forty-four words of frame x. FIG. 2 illustrates the following frame, i.e., frame x+1, in which new information is provided in the first forty-four words and duplicate information of that provided in frame x is transmitted in the second fortyfour words. Pagers that receive duplicate messages are able to exactly determine the location of each bit of a duplicate message because the duplicate messages are always provided in the same order within a second forty-four word segment of the subsequent frame. Therefore, a pager can select correct bits from both the new information, which is included in a first frame, and the duplicate information, which is included in a second frame, then recombine the bits to form an entire correct message.

However, this approach to TD results in a 50% decrease in capacity because a predetermined half of each frame is always dedicated to the transmission of duplicate information. When two or more repeat messages are transmitted, the situation worsens. For example, when four transmissions of each message are provided, each frame is divided into four even segments. New information is transmitted within the first segment of each frame, while the remaining three segments are dedicated to the transmission of duplicate information. Therefore, such a system results in a 75% decrease in capacity from a non-TD FLEX™ system.

A further problem is that, in the described BCTD system, only pre-programmed pagers can receive the duplicate messages. As mentioned above, FLEX™ conventionally includes an address field followed sequentially by vector and message fields for each frame. In the prior art BCTD system, though, the address, vector, and message fields associated with duplicate transmissions are positioned within the inner regions of the frame separate from fields associated with original transmissions. Only pre-programmed pagers therefore know to look in the middle of the frames for the duplicate transmissions. Other pagers, such as those that may roam into the system, will miss the duplicate transmissions because the roaming pagers only expect to find, for each frame, a single address field followed by one vector field and one message field.

The conventional prior art BCTD system is further problematic in that the limited number of words dedicated to original transmissions can result in the delayed transmission of lengthy messages or the fragmentation of lengthy messages into smaller portions for transmission. In either situation, the subscriber must wait a longer time than usual for message reception because his pager is waiting for the entire transmission of the message or for a later-transmitted portion of the long message. As a result, subscribers can be inconvenienced by the delay of message reception.

In FLEX™, messages transmitted to each pager are generally sequentially numbered so that when a message is missed, the pager subscriber can call into the base station and request the re-transmission of the message that was missed. In the prior art BCTD system, though, the pager can receive a new message before a message having a previous number has been correctly "built." For example, the pager could erroneously receive a first transmission of message 1, correctly receive a first transmission of message 2, then receive the duplicate transmission of message 1. In this case, the pager would conclude that message 1 had been missed because message 2 was received first. Therefore, the prior art BCTD system can cause pagers to erroneously determine that messages have been missed.

Thus, what is needed is a method and apparatus for sending duplicate transmissions without decreasing system capacity by a predetermined, fixed amount and without significantly decreasing battery life. Furthermore, the method and apparatus should provide for reception of duplicate transmissions by roaming pagers. The method and apparatus should also provide for the transmission of duplicate messages without unreasonable delay and should not result in missed messages when the system operates on a "numbered messaging" scheme.

BRIEF DESCRIPTION OF THE DRAWINGS

FIGS. 6–9 are signal diagrams depicting fields included in the frames of FIG. 5 in accordance with the present invention.

DESCRIPTION OF A PREFERRED EMBODIMENT

Figures 1, 2, 3:
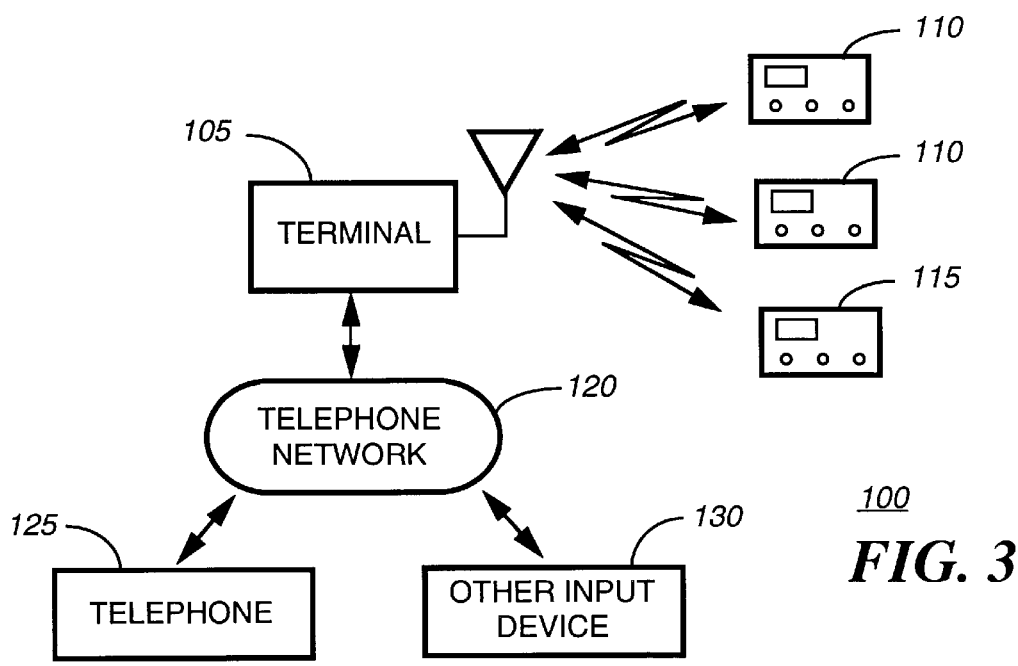
FIG. 1 is a signal diagram of a radio signal including a frame in which new message information is conventionally transmitted.
FIG. 2 is a signal diagram of a radio signal including another frame in which duplicate information, corresponding to the new information of FIG. 1, is conventionally transmitted.
FIG. 3 is a block diagram of a communication system for transmitting duplicate information in accordance with the present invention.

FIG. 3 is a block diagram of an acknowledge-back communication system 100 including a message transmission device, such as a terminal 105, for transmitting messages to both time diversity (TD) transceivers 110, such as portable pagers capable of transmitting and receiving, and non-TD receiving devices 115. The terminal 105 can be coupled to a telephone network 120 for receiving the messages thereover. Messages are generally provided to the telephone network 120 by conventional telephones 125 or other input devices 130, and information, such as addresses, by which destination pagers can be identified usually accompanies the messages. Messages to non-TD pagers are transmitted only once by the terminal 105, while messages intended for reception by TD pagers are transmitted more than one time unless a recipient TD pager transmits an acknowledgment for a message to the terminal 105. For example purposes only, the following description describes a communication system 100 in which messages intended for reception by TD transceivers 110, e.g., pagers, are transmitted two times unless acknowledgments for messages are received by the terminal 105. It will be appreciated, however, that duplicate messages may be transmitted more than a single time in other embodiments of the present invention.

Preferably, the terminal 105 transmits information over the air using a signalling protocol, such as REFLEX™. The REFLEX™ protocol is, in many respects, similar to the FLEX™ protocol, which is mentioned briefly in the above Background of the Invention. The REFLEX™ protocol involves the division of a transmitted radio signal into cycles of one-hundred-twenty-eight (128) frames, each including a predetermined synchronization pattern (sync) and a plurality of words. When the radio signal is to be transmitted at 1600 bits per second, for example, eighty-eight words are included in each REFLEX™ frame. These eighty-eight words are usually divided into an address field, which includes addresses of pagers to which messages are being transmitted, a vector field following the address field, and a message field. Some addresses, such as those referring to numeric or alphanumeric messages, refer to a vector contained in the vector field, which specifies an area within the message field wherein a corresponding message is located.

In conventional REFLEX™ systems, pagers are assigned a home frame in which messages can be received. A pager generally receives its messages in the home frame or at subsequently recurring intervals, the time of which is determined by a pre-programmed pager variable and/or a system variable transmitted in each frame. These variables, commonly referred to as either a system collapse or a pager collapse, are each in the form of an integer. In conventional REFLEX™ systems, the pager wakes up from conventional battery saving to received messages in frames given by the formula:

$$\text{Receive Frame Nos.} = \text{Home Frame No.} + n2^{sc},$$

where n=0, 1, 2, 3, . . . , and where sc denotes the system collapse. In other words, if the collapse used by the pager equals five, and the pager is assigned to a home frame of one, then the pager will wake up to receive messages in the first frame, which is the home frame and which is given by the above formula when n is zero. When n is one, the pager will wake in the thirty-third frame, and so on. In this manner, the pager will periodically wake up every thirty-two frames to receive messages.

According to the present invention, at least some of the recipient TD pagers 110 are acknowledge-back pagers that transmit acknowledgments to the terminal 105 in response to message reception. In this manner, the terminal 105 need not transmit duplicate messages to pagers that have acknowledged reception, thereby reducing the messaging traffic on the communication channel. Preferably, a TD pager 110 acknowledges reception of a message by transmitting a predetermined data pattern to the terminal 105 at a predetermined time. For example, the terminal 105 could send "acknowledgment frame information" during each frame to inform pagers receiving messages in that frame when to reply. Alternatively, TD pagers could acknowledge reception of a message by transmitting the acknowledgment during a later frame, i.e., a response frame, having a predetermined relationship to the frame in which the message was received. Preferably, the response frame occurs earlier in time than a next frame in which the TD pager would receive a duplicate message such that the terminal 105 can remove the duplicate message from the paging queue if transmission is unnecessary.

In conventional REFLEX™ systems, the system collapse varies according to the traffic in the system. When the system is crowded, the system collapse can be decreased to clear messages from a terminal more rapidly. Once the messages have been transmitted, the system collapse can then be increased again. A pager can normally utilize its pre-programmed collapse, rather than the system collapse, for receiving messages. When the system collapse falls below the pager collapse, though, the pager employs the system collapse instead. For simplicity, pagers included in the communication system 100 according to the present invention are described as using only the system collapse. It will be appreciated, however, that the frames in which the messages are transmitted to a pager will vary when the pager switches between system collapse and pager collapse.

For example purposes only, the system collapse for the communication system is described as being five, i.e., sc=5. In alternative embodiments of the present invention, though, the system collapse could be set to various other integer values. The system collapse used by the pager is related to an amount of time, i.e., the system collapse time, in which a particular number of frames is transmitted. The number of frames transmitted in the system collapse time is given by the formula:

no. of frames $=2^{sc}$.

Therefore, when the system collapse equals five, thirty-two frames are transmitted in the system collapse time.

Figure 4:
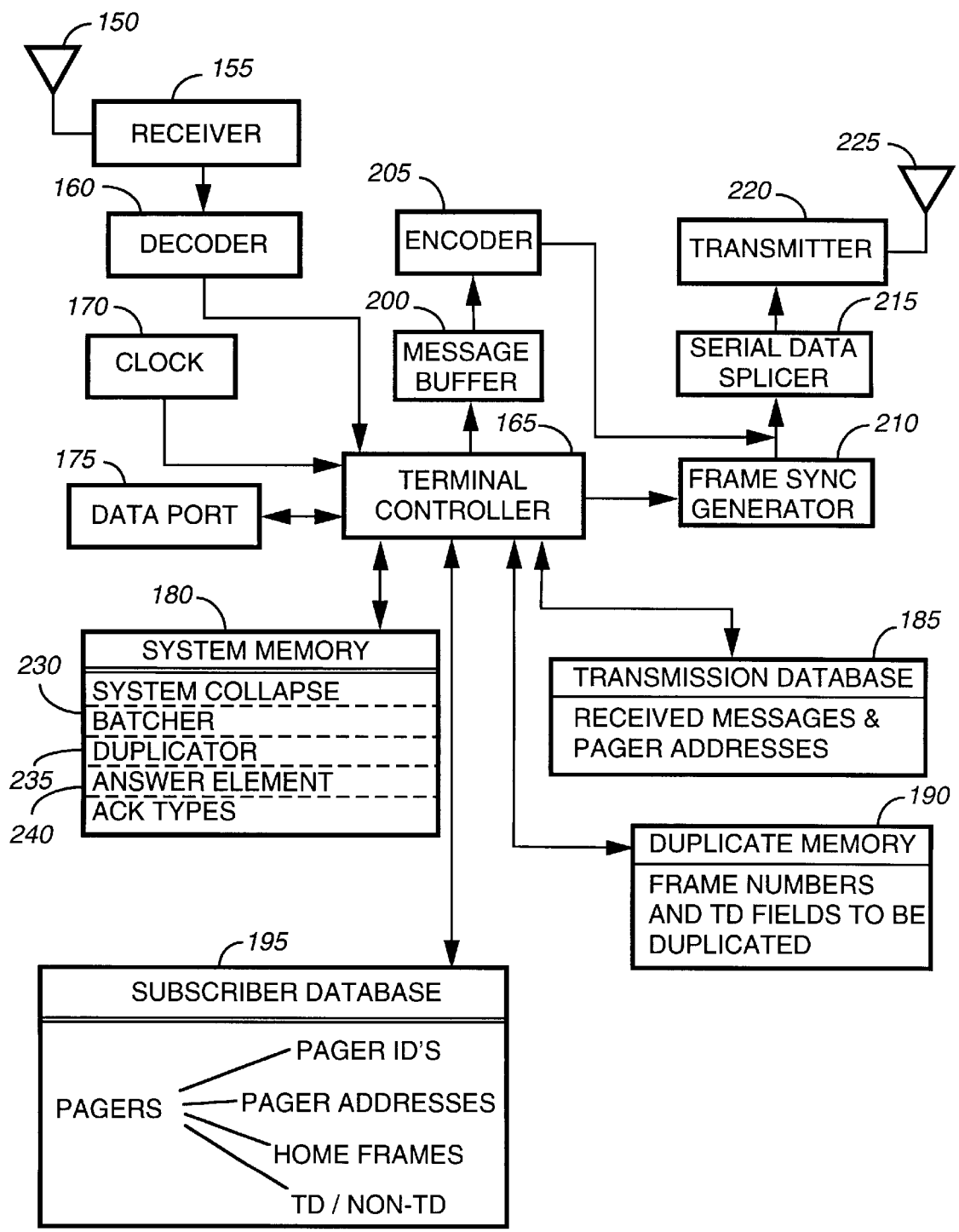
FIG. 4 is an electrical block diagram of a terminal included in the communication system of FIG. 3 in accordance with the present invention.

Referring next to FIG. 4, an electrical block diagram of the terminal 105 is shown. The terminal 105 includes a data port 175 for receiving messages and information for identifying recipient pagers. Alternatively, the terminal 105 could include a modem, data entry device, or any other circuitry instead of or in addition to the data port 175. A controller 165 controls the operation of the terminal 105 and receives information from the data port 175. The terminal 105 further includes a clock 170 for providing time values and a subscriber database 195 for storing information about system subscribers. Such stored information can, for example, comprise a listing of all pagers subscribing to the system, an address corresponding to each pager, and an indication of whether each pager is a TD pager, e.g., one that can receive at least one duplicate message, or a non-TD pager, e.g., one that receives only a single transmission of each message. Additionally, according to the present invention, the subscriber database 195 stores the home frame to which each pager is assigned.

The terminal 105 further comprises a transmission database 185 for storing received messages and addresses of pagers to which the messages are to be transmitted. A duplicate memory 190 stores information transmitted to TD pagers and frame numbers associated with frames in which the information was transmitted. Also, a system memory 180 is coupled to the controller 165 for storing a conventional system collapse variable corresponding to an amount of time during which a pager can "sleep" to conserve battery life and for storing types of acknowledgments, such as an acknowledgment requesting transmission of a previously transmitted message, that can be transmitted by the pagers.

A batcher 230 is included in the terminal 105 for gathering from the transmission database 185 addresses of and messages for TD pagers. Duplicate information intended for TD pagers is provided by a duplicator 235 to the controller 165 for transmission during certain frames. Additionally, an answer element 240 is coupled to the controller 165 for processing pager acknowledgments received by an antenna 150, demodulated by a receiver 155, and decoded by a decoder 160. Different types of acknowledgments recognized, for example, by different predetermined data patterns are stored in the system memory 180.

The batcher 230, duplicator 235, and answer element 240 can comprise firmware that is stored in the system memory 180 for execution by the controller 165 during the operation of the terminal 105. Alternatively, the batcher 230, duplicator 235, and answer element 240 can be implemented using hardware capable of performing equivalent operations.

Preferably, the controller 165 gathers information to be transmitted during each frame into address, vector, and message fields according to the REFLEX™ protocol. The information is then coupled to a message buffer 200 for temporarily storing the information until a time for further processing and transmission. Frames are transmitted in numeric sequence, so that while a current frame is being transmitted, the next frame to be transmitted is in the message buffer 200, and the next frame thereafter is being gathered by the controller 165. At the appropriate time, the information stored in the message buffer 200 is transferred to the encoder 205 for encoding the information into a conventional signalling format such as REFLEX™.

The controller 165 next enables a frame sync generator 210, which generates the predetermined synchronization (sync) pattern that is transmitted at the start of each frame transmission. The sync pattern is multiplexed with the encoded information by the serial data splicer 215, which generates a message stream. The message stream is transmitted by a transmitter 220 over an antenna 225 for reception by pagers in the communication system 100.

According to a preferred embodiment of the present invention, the terminal 105 transmits original and duplicate messages, when necessary, to TD pagers in different frames. However, predetermined portions of the frames are not allocated in advance for transmission of original messages or duplicate messages. Instead, as each frame is to be transmitted, only portions of the frame necessary to accommodate duplicate transmissions to TD pagers are utilized. The other portions of the frame are then queued with original transmissions to TD pagers and information intended for reception by non-TD pagers. In this manner, the automatic reduction in capacity that is present in prior art TD systems does not occur in the communication system 100 according to the present invention.

Preferably, when original messages are erroneously received or decoded by TD pagers, the TD pagers included in the communication system 100 utilize bit combination time diversity (BCTD) techniques to combine bits of original message and address information with bits of duplicate message and address information, thereby arriving at a correct message and address. Although the original transmissions do not require a predetermined, fixed allocation of portions of the frames in advance, it will be appreciated that each bit included in the duplicate transmission should be transmitted in a location within its frame that is determined by the location in which a corresponding bit included in the original transmission was queued.

As mentioned above, the system collapse preferably equals five such that thirty-two frames are transmitted in the system collapse time. In other words, pagers in the system 100 normally wake up in their home frames and every thirty-two frames thereafter for message reception. However, TD pagers can receive duplicate transmissions when messages have been received erroneously. It is preferably that duplicate message reception for TD pagers not be delayed for greater than the system collapse time, so, according to the present invention, TD pagers wake up more often than non-TD pagers when duplicate messages are to be received.

Figure 5:
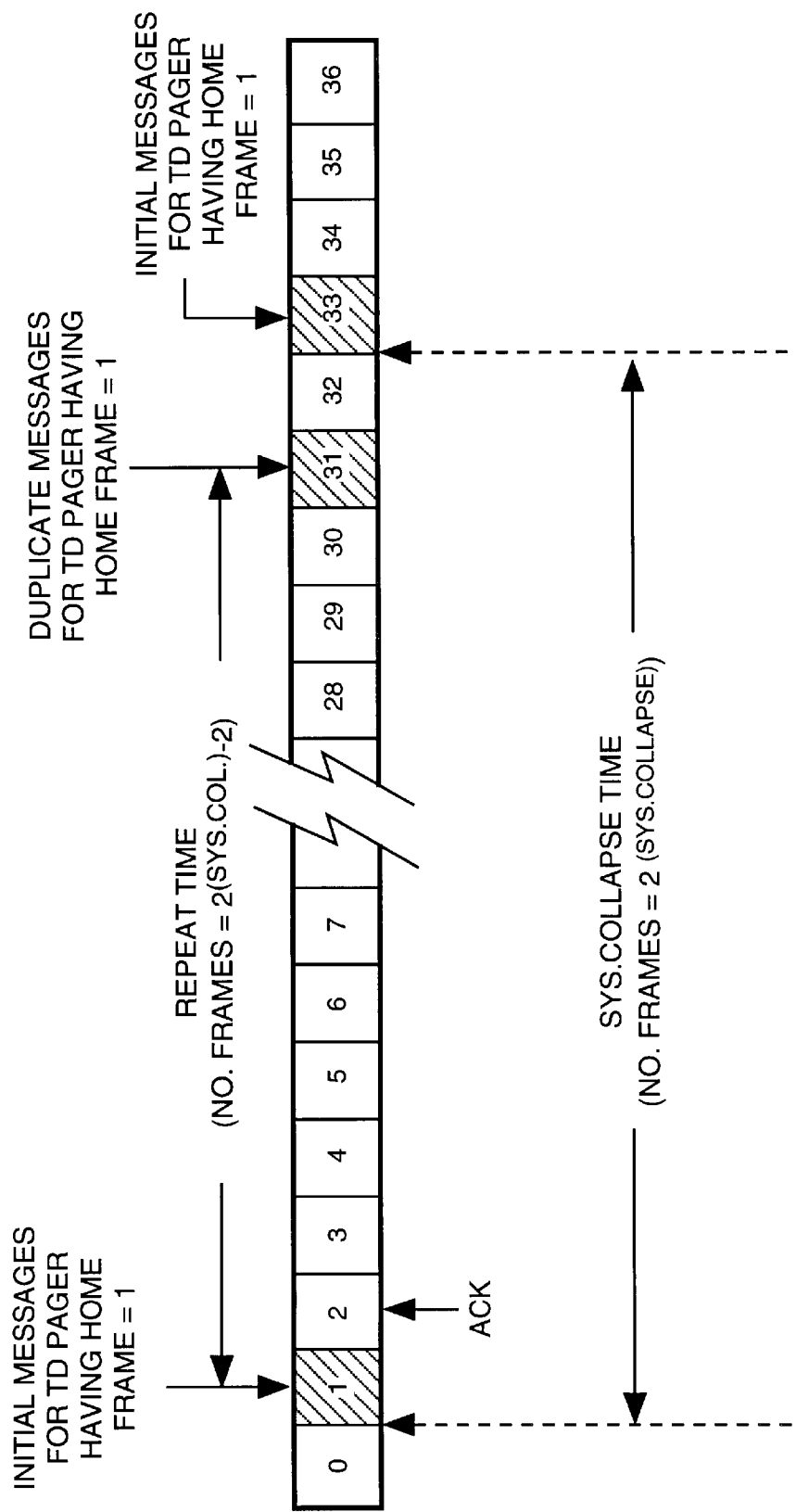
FIG. 5 is a signal diagram of a radio signal including a number of frames in which original and duplicate information is transmitted in accordance with the present invention.

The transmission of duplicate messages to TD pagers can be better understood by referring to FIG. 5, which is a signal diagram depicting the transmission of duplicate messages using the REFLEX™ protocol. In the present example, in which the system collapse equals five, pagers can receive initial information in home frames and every thirty-two frames thereafter. TD pagers that have not acknowledged an original message also wake up a predetermined time after transmission of the original message. This amount of time, referred to as a repeat time, is characterized by a number of frames given by the following formula:

$$\text{no. frames in repeat time} = 2^{sc} - q,$$

where sc denotes the system collapse, and q is a variable representing a particular number of frames, such as two, i.e., q=2. In other words, for a sc=5 and q=2, the repeat time is characterized by thirty frames.

For instance, when a TD pager is assigned a home frame of "one", it will wake up to receive original information in the first frame and every thirty-two frames thereafter. When the TD pager correctly receives the original message transmitted in frame one, it preferably transmits an acknowledgment to the terminal 105 indicating that no duplicate transmission is required. The acknowledgment should be transmitted prior to occurrence of the frame in which the duplicate message would normally be transmitted. In this example, the duplicate message would normally be transmitted in the thirty-first frame, which is thirty frames after the frame in which the original message was transmitted. Therefore, the acknowledgment should be transmitted to the terminal 105 prior to the thirty-first frame so that the terminal 105 does not unnecessarily transmit the duplicate message.

Information indicative of when acknowledgments should be transmitted can, for instance, be stored in TD pagers or be transmitted by the terminal 105 along with initial information. In either case, though, it is preferably that the acknowledgment be transmitted from a TD pager to the terminal 105 within a relatively short amount of time so that the terminal 105 has sufficient time to queue and transmit subsequent frames without wasting space for unnecessary duplicate transmissions. Therefore, in this example, the TD pagers will be described as transmitting acknowledgments in frames that immediately follow "initial frames," i.e., frames in which initial information is transmitted. This arrangement provides a maximum amount of time for the terminal 105 to appropriately queue "duplicate frames," i.e., frames in which duplicate information is transmitted in the absence of expected acknowledgments.

Because duplicate messages for a particular pager are transmitted prior to transmission of additional initial information, both TD pagers and non-TD pagers completely receive messages within the system collapse time. This is especially advantageous in communication systems utilizing message numbering schemes in which messages to each pager are sequentially numbered so that the subscriber can call in for missed messages. In such a system, the terminal 105 according to the present invention has transmitted all duplicate messages prior to transmission of another original message in another repeat cycle. As a result, a TD pager has the opportunity to completely build an error-free message with a previous number before a message having the next number is transmitted. Unlike prior art BCTD systems, therefore, the pager does not erroneously conclude that a message has been missed when duplicates are still remaining to be transmitted.

Additionally, the transmission of all duplicates of a message within one system collapse time allows duplicate messages to be cleared out of the system very quickly, i.e., in one battery save cycle. Therefore, a system can switch to the transmission of a different protocol in a short time period. For instance, the communication system 100 can, within one battery save cycle of the pagers, transmit all of the duplicate TD information, then begin transmitting information formatted using another format, such as the conventional FLEX™ protocol in which duplicate messages are not transmitted. Also, during the transmission of necessary duplicate TD information, new non-TD information can still be sent in available portions of the frame so that the channel is used efficiently.

In the prior art BCTD system, on the other hand, pagers operate on a conventional battery save cycle and therefore only awake for reception at times indicated by the system collapse value. A pager in the conventional BCTD system will not receive all of its duplicate messages until several battery save cycles elapse. During this time period, if the system is to switch transmission protocols, no new information can be provided. Instead, in frames in which duplicate messages are transmitted, the portions of the frames dedicated to the transmission of new information will remain empty to allow the system to clear out all of the TD information. In the conventional BCTD system, unlike the system 100 according to the present invention, this results in a relatively long period of time in which the paging channel is inefficiently utilized to transmit only duplicate messages. Furthermore, in the conventional BCTD system, duplicate messages are transmitted even when original messages have been received correctly by the targeted pagers, which results in further system inefficiencies. In the system 100 according to the present invention, conversely, duplicate messages need not be transmitted to pagers that correctly received initial transmissions.

In summary, the following formulas assist in understanding the transmission of information to TD pagers in the communication system 100 according to the present invention.

$$\text{no. frames in system collapse time} = 2^{sc}, \quad (1)$$

$$\text{initial frame nos.} = \text{home frame no.} + n2^{sc}, \text{ and} \quad (2)$$

$$\text{duplicate frame nos.} = \text{initial frame nos.} + 2^{sc} - q, \quad (3)$$

where n=0, 1, 2, 3, . . . , sc denotes "system collapse", and q represents a redetermined variable such as "two." The term "initial frame nos." describes frames in which initial transmissions are provided to TD pagers, while the term "duplicate frame nos." describes frames in which duplicate transmissions are provided to TD pagers absent acknowledgments.

It will be appreciated that, in embodiments in which more than one duplicate message is transmitted to TD pagers, the formulas will change to accommodate the additional duplicate messages. For example, when duplicate messages are provided multiple times, duplicate frame numbers could be given by the following formula:

$$\text{duplicate frame nos.} = \text{initial frame nos.} + 2^{sc} - mq,$$

where m is an integer value ranging from the number of duplicates, e.g., "two" when two duplicate messages are to be transmitted, down to "one." When sc=5 and three duplicate messages are to be transmitted (m=3), a pager that has erroneously received an initial message in frame one will wake up to receive a first duplicate message in frame twenty-seven because m is initially set to equal the number of duplicate messages. When the pager cannot form a complete message even after transmission of the first duplicate message, it wakes up to receive the second duplicate message in frame twenty-nine because m is decremented to equal two. When a complete message still cannot be formed, the pager wakes up to receive the third duplicate message in frame thirty-one because m is further decremented to equal one.

Preferably, the terminal 105 provides, as a part of the sync pattern, information by which the pager can determine, in a manner well known to one of ordinary skill in the art, whether the system is a TD system, the number of repeats in the TD system, and the value of the system collapse. Alternatively, in a system in which the pager subscriber specifies the number of desired repeat messages, the terminal 105 need not transmit information indicative of a number of repeats in the system 100.

The pager is pre-programmed with information by which it can adjust its wake-up time in accordance with the system collapse and the number of repeated messages. For instance, the sync pattern could include information indicative of the variables sc, representing system collapse, and q, which determines the frame numbers in which the pager wakes to receive duplicate messages. Alternatively, q could be pre-programmed into the pagers. It will be appreciated that the variable q should be large enough to ensure sufficient time between duplicate transmissions for transmission, reception, and processing of pager acknowledgments.

FIGS. 6–10 are signal diagrams depicting transmission of information queued into frames by the controller 165 (FIG. 4) according to the present invention. FIG. 6 depicts an example of the transmission of initial information in frame one (FRAME1). As shown, words 0–16 of FRAME1 include TD addresses, and words 17–23 include non-TD addresses. Together, words 0–23 comprise an address field. A vector field including TD vectors, at words 24–33, and non-TD vectors, at words 34–39, follows the address field. Additionally, a message field appended to the vector field comprises TD messages, at words 40–66, and non-TD messages, at words 67–87. According to the example of FIG. 6, FRAME1 includes initial transmissions for TD pagers as well as information for non-TD pagers. The lack of duplicate information for TD pagers could result, for instance, from a situation in which all TD pagers acknowledged initiation information received thirty frames ago (given sc=5 and q=2) or from a situation in which no initial TD messages were transmitted thirty frames ago. In either situation, no duplicate messages need be transmitted in FRAME1.

When the system collapse equals five, duplicate information is transmitted in FRAME31 to the TD pagers that received initial information in FRAME1 and that did not acknowledge error-free reception of the initial information, as shown in FIG. 7. The duplicate information not only comprises the same information as that previously transmitted to the non-acknowledging TD pagers in FRAME1, but also is located in equivalent locations within the duplicate frame, FRAME31. More specifically, the duplicate TD addresses of FRAME31 are transmitted at words 0–16 because the original TD addresses were transmitted at words 0–16 of FRAME1. This is also true for the duplicate TD vectors and messages. In this manner, a TD pager utilizing BCTD techniques can easily determine which bits of FRAME31 correspond to the bits of FRAMES. According to the present invention, after the duplicate information has been positioned, FRAME31 is queued with initial transmissions for TD pagers and information for non-TD pagers.

FIG. 8 depicts FRAME61, in which duplicate messages are transmitted for TD pagers that received initial messages in FRAME31 and that did not acknowledge reception of the initial messages. As shown, bits of duplicate information are transmitted in locations of FRAME61 that are equivalent to locations in which bits of initial information were transmitted in FRAME31. After placement of the duplicate information, new TD information and non-TD information are queued into the remaining words of FRAME61. Preferably, all of the information to be transmitted is arranged such that a single address field, a single vector field, if necessary, and a single message field results.

FIG. 9 depicts an example of duplicate transmissions in FRAME31 when at least one recipient TD pager that received initial messages in FRAME1 has acknowledged message reception. According to the present invention, information associated with an acknowledging pager is not retransmitted; however, bits of the information to be retransmitted are still placed in locations of FRAME31 that are equivalent to locations of FRAMEI in which bits of the initial information were transmitted. In the present example, the TD pager or pagers that received addresses at words 6–10, vectors at words 27–29, and messages at words 48–58 acknowledged reception of initial information transmitted in FRAME1. Therefore, no duplicate information has to be transmitted to the acknowledging pager(s). The duplicate information for the other non-acknowledging pagers is still transmitted at words 0–5 and 11–16 (for addresses), words 24–26 and 30–33 (for vectors), and words 40–47 and 59–66 (for messages). After the duplicate information is positioned, remaining words, including words 6–10, 27–29, and 48–58, can be queued with new TD information and non-TD information. This results in the efficient use of the communication channel since words are conveniently freed for transmission of other information in response to acknowledgments from TD pagers.

According to the present invention, most TD pagers will probably receive initial messages correctly in usual day-to-day operation. However, it is anticipated that messages will be erroneously received or missed entirely due to fading signals, low batteries, out-of-range locations, etc. In such situation, gaps between duplicate addresses, vectors, and messages can result, as shown in FIG. 9. It is foreseeable that, at some point, the address, vector, and message fields could become so fragmented that useful information cannot be transmitted in the word or words filling the gaps. When this occurs, the terminal 105 preferably fills the useless word gaps with idle words, i.e., predetermined patterns of bits, that are ignored by the pagers in the system 100.

According to the present invention, the number of words required for transmission of TD information advantageously varies from frame to frame each REFLEX™ cycle depending not only upon the TD pagers scheduled to wake during each frame, but also upon the number of messages actually received by the terminal 105 for transmission to TD pagers during each frame. Therefore, reduction in system capacity due to duplicate transmissions occurs only on an as-needed basis. For instance, relatively few words of a particular frame may be consumed by the transmission of duplicate TD messages when, in the original frame, only a small number of messages were required to be transmitted to TD pagers or when some or all of the TD pagers correctly received initial messages and transmitted acknowledgments.

In the prior art BCTD systems, conversely, a predetermined number of words in every frame is automatically reserved for the transmission of duplicate information. This predetermined number of words is fixed and cannot be dynamically changed to accommodate the transmission of either less or more duplicate information. Therefore, system capacity is always reduced by a predetermined amount, resulting in inefficient use of the radio channel.

Although FIGS. 6–9 depict the grouping of TD and non-TD information, at least for initial transmissions, the TD and non-TD information could alternatively be sprinkled throughout each field (not shown). For instance, TD and non-TD information could be mixed within the address field, the vector field, and the message field as long as the locations of the TD information were duplicated in any duplicate frames so that a TD pager could locate the duplicate TD information.

Figure 10:
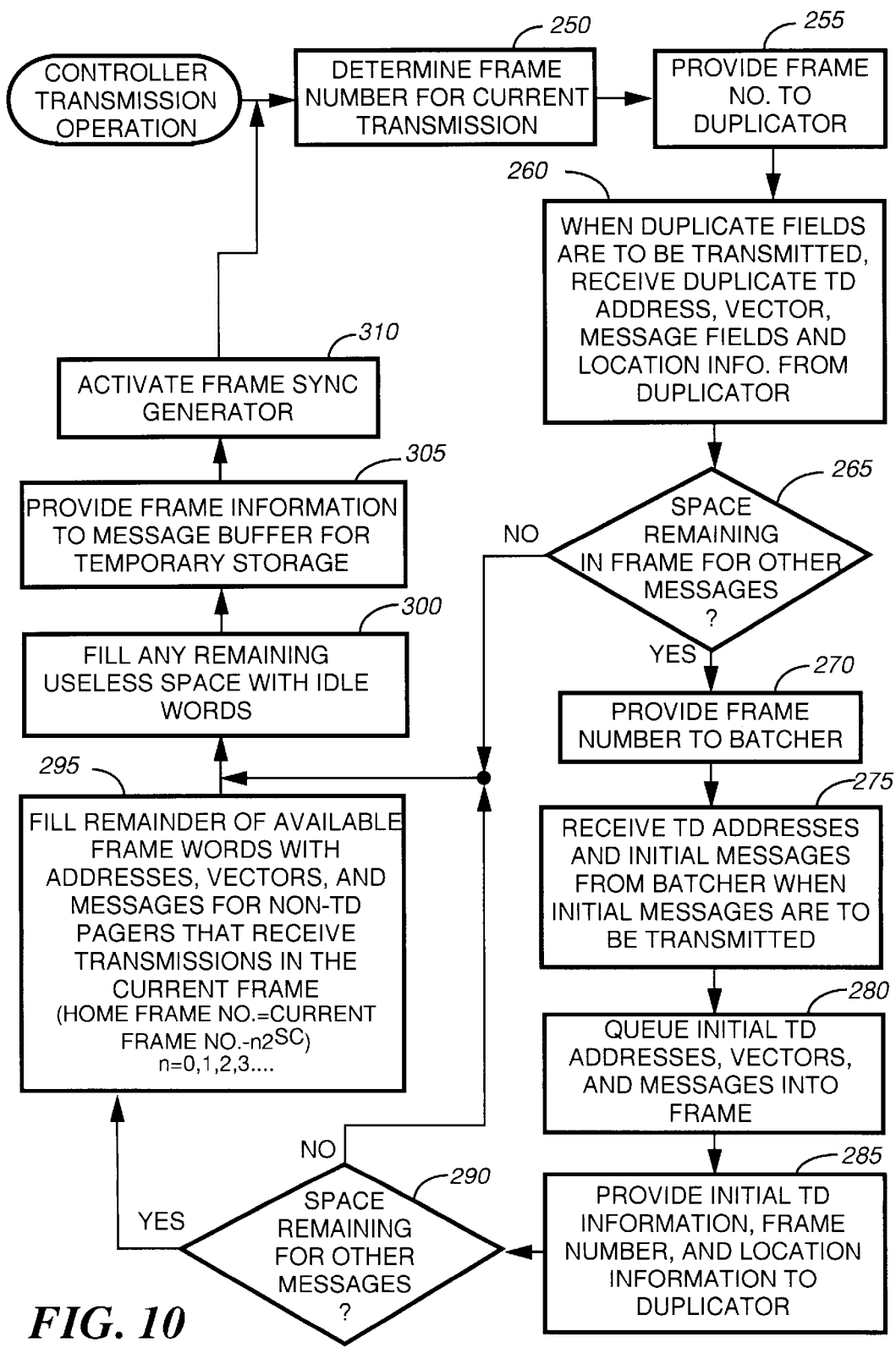
FIG. 10 is a flowchart depicting an operation of a controller included in the terminal of FIG. 4 in accordance with the present invention.

Referring next to FIG. 10, a flowchart depicts a transmission operation of the controller 165 (FIG. 4) according to the present invention. At step 250, the controller 165 determines the frame number for the current transmission, subsequent to which the frame number is provided, at step 255, to the duplicator 235. At step 260, the controller 165 receives, when duplicate fields are to be transmitted, duplicate TD address, vector, and message fields from the duplicator 235. Duplicate bits, i.e., bits of the duplicate fields, are positioned in the current frame at locations equivalent to locations where duplicated bits, i.e., bits of the initial fields, were queued in the initial frame. This can be done, for example, according to location information also received from the duplicator 235.

When, at step 265, there is space remaining in the current frame after placement of the duplicate fields, the controller 165 provides, at step 270, the frame number to the batcher 230 (FIG. 4), subsequent to which TD addresses and initial messages, if any, are received, at step 275, from the batcher 230 for transmission during the current frame. After generation of appropriate vectors, the TD addresses, vectors, and initial messages are queued, at step 280, into the current frame. The initial TD information is provided, at step 285, to the duplicator 235. Preferably, the controller 165 also provides the duplicator 235 with location information specifying the locations of the queued initial TD information. The location information can, for example, comprise word numbers associated with the initial TD addresses, vectors, and messages.

When, at step 290, space remains in the frame for other messages, the controller 165 fills, at step 295, the available words of the current frame with information for non-TD pagers that are programmed to receive information in the current frame. In other words, available space in the current frame is queued with addresses, vectors, and messages for non-TD pagers that having home frame number=current frame number$-n2^{sc}$, where n=0, 1, 2, 3. . . Thereafter, the controller 165 queues, at step 300, any remaining useless space in the frame with "idle words," which are recognized as meaningless by recipient pagers. The frame information is then provided, at step 305, to the message buffer 200 for temporary storage, and the frame sync generator 210 is activated, at step 310.

Figure 11:
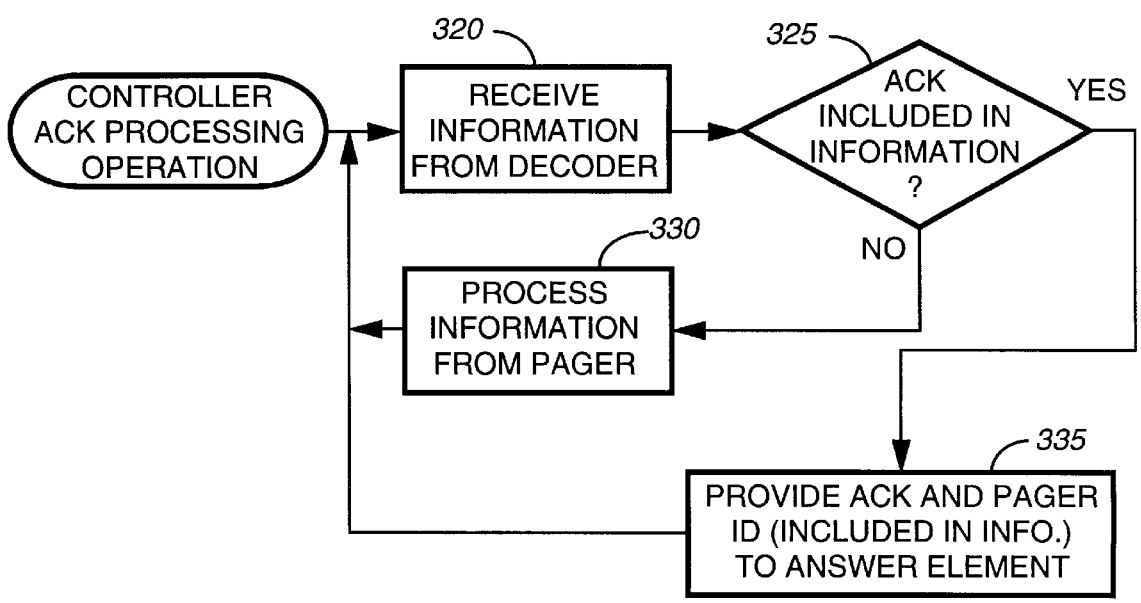
FIG. 11 is a flowchart depicting an operation of an acknowledgment processing operation of the controller included in the terminal of FIG. 4 according to the present invention.

FIG. 11 is a flowchart of an operation of the controller 165 for processing acknowledgments (ACKs) received by the controller 165. At step 320, the controller 165 receives information from the decoder 160 (FIG. 4). When, at step 325, an ACK from a pager is included in the information, the ACK and the pager identification information (ID) of the acknowledging pager are provided, at step 335, to the answer element 240. Preferably, the controller 165 recognizes the ACK by referencing the system memory 180, which stores predetermined data patterns corresponding to different ACK types. The pager ID of the responding pager is preferably included as a part of the information transmitted with the ACK and received by the terminal 105. Alternatively, the pager ID could be determined by other methods, such as recognition of a particular time slot during which the ACK was received. When, at step 325, an ACK is not included in the received information, the controller 165 proceeds with other conventional processing operations, at step 330.

According to the present invention, initial information can be transmitted every system collapse time to TD pagers. Preferably, the pagers acknowledge reception of the initial messages within the system collapse time. For example, the pagers can receive information or be programmed with information indicating that messages are to be acknowledged in the frame immediately following transmission of initial messages.

Figure 12:
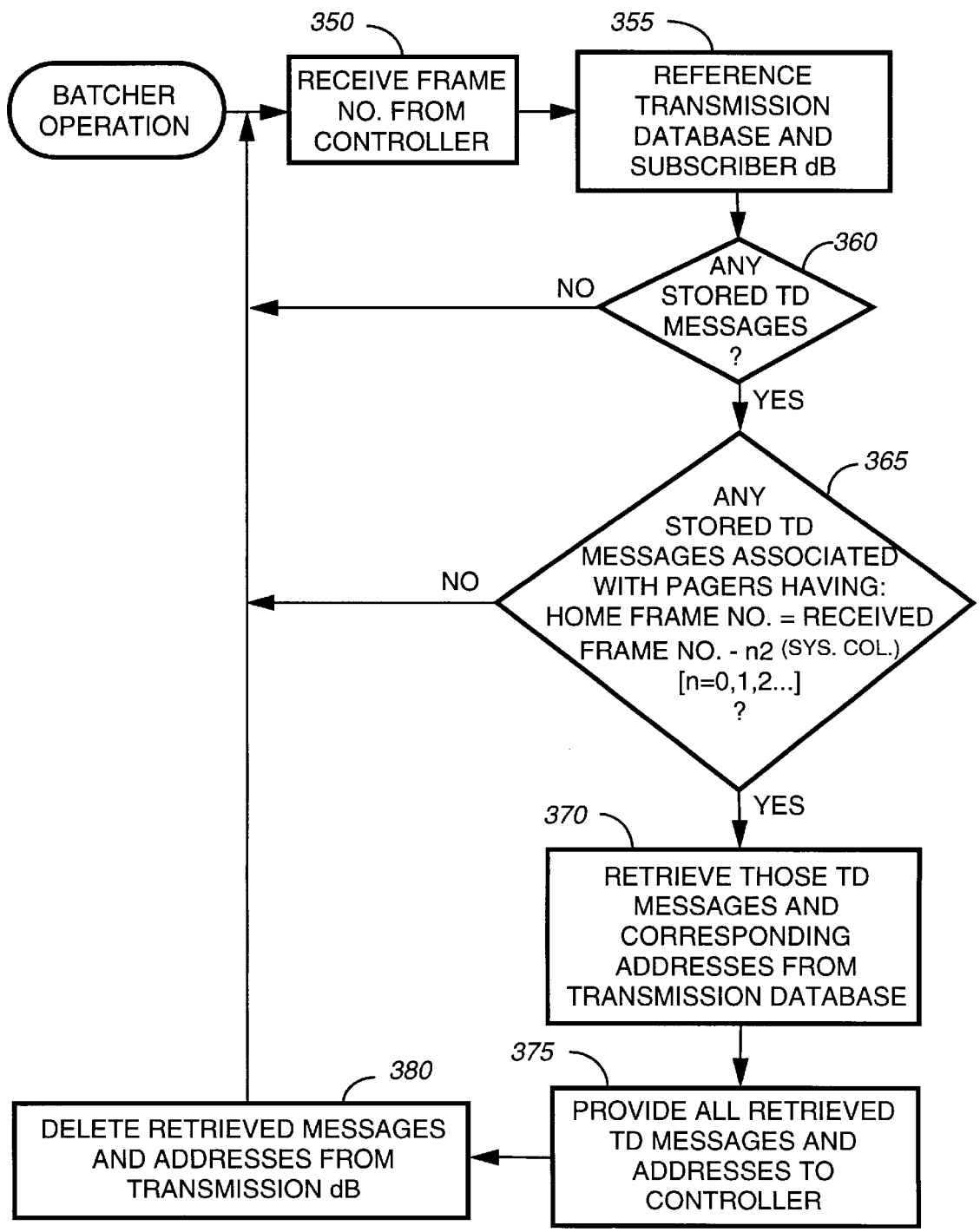
FIG. 12 is a flowchart of an operation of a batcher included in the terminal of FIG. 4 in accordance with the present invention.

FIG. 12 is a flowchart illustrating an operation of the batcher 230 according to the present invention. At step 350, the batcher 230 receives a frame number from the controller 165 and, at step 355, references the transmission database 185 and subscriber database 195. When information stored in the databases 185, 195 indicates that TD messages are currently stored, at step 360, the batcher 230 further determines, at step 365, whether any of the stored TD messages are to be transmitted in the current frame. This is done by determining which, if any, stored TD messages are associated with pagers having a home frame given by the formula home frame number=current frame number$-n2^{sc}$, where n=0, 1, 2, 3, . . . When stored TD messages are to be transmitted in the current frame, as indicated by the frame number provided by the controller 165 to the batcher 230, those TD messages and associated TD addresses are retrieved, at step 370, and provided, at step 375, to the controller 165. The retrieved messages and addresses can then be deleted, at step 380, from the transmission database 185.

Figure 13:
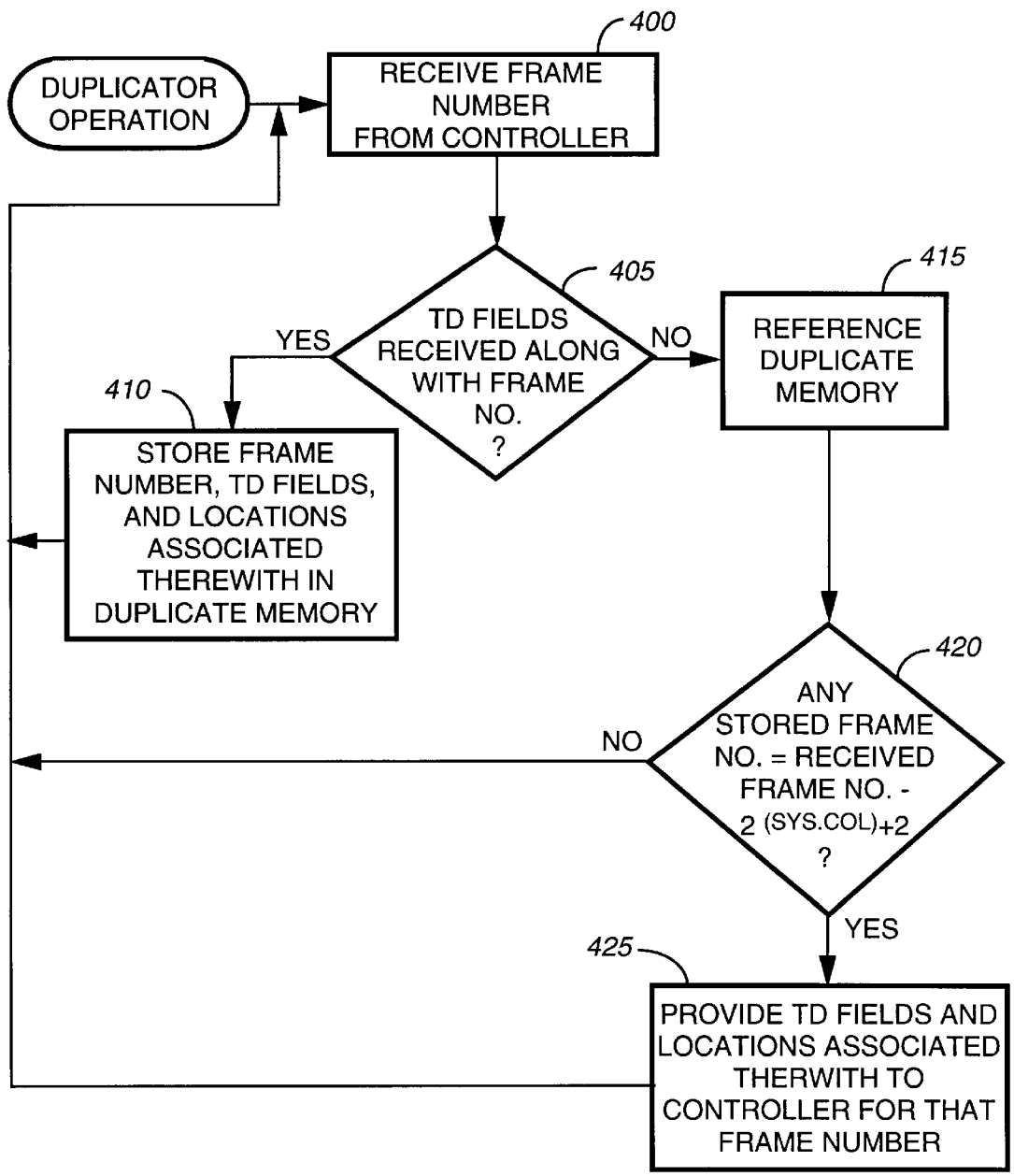
FIG. 13 is a flowchart of an operation of a duplicator included in the terminal of FIG. 4 in accordance with the present invention.

Referring next to FIG. 13, a flowchart illustrates an operation of the duplicator 235. At step 400, the duplicator 235 receives a frame number associated with the current frame from the controller 165. When, at step 405, TD information is received along with the frame number, the received frame number, TD fields, and location information are stored, at step 410, in the duplicate memory 190. When no TD information is received along with the frame number, the duplicate memory 190 is referenced, at step 415, to determine, at step 420, whether any duplicate TD information is to be transmitted in the current frame. This can be done, for instance, by determining whether any stored information satisfies the following formula:

any stored frame number=received frame number$-2^{sc}+2$.

When, at step 420, duplicate TD information is to be transmitted in the current frame, the TD information and location information associated therewith are provided, at step 425, to the controller 165.

Figure 14:
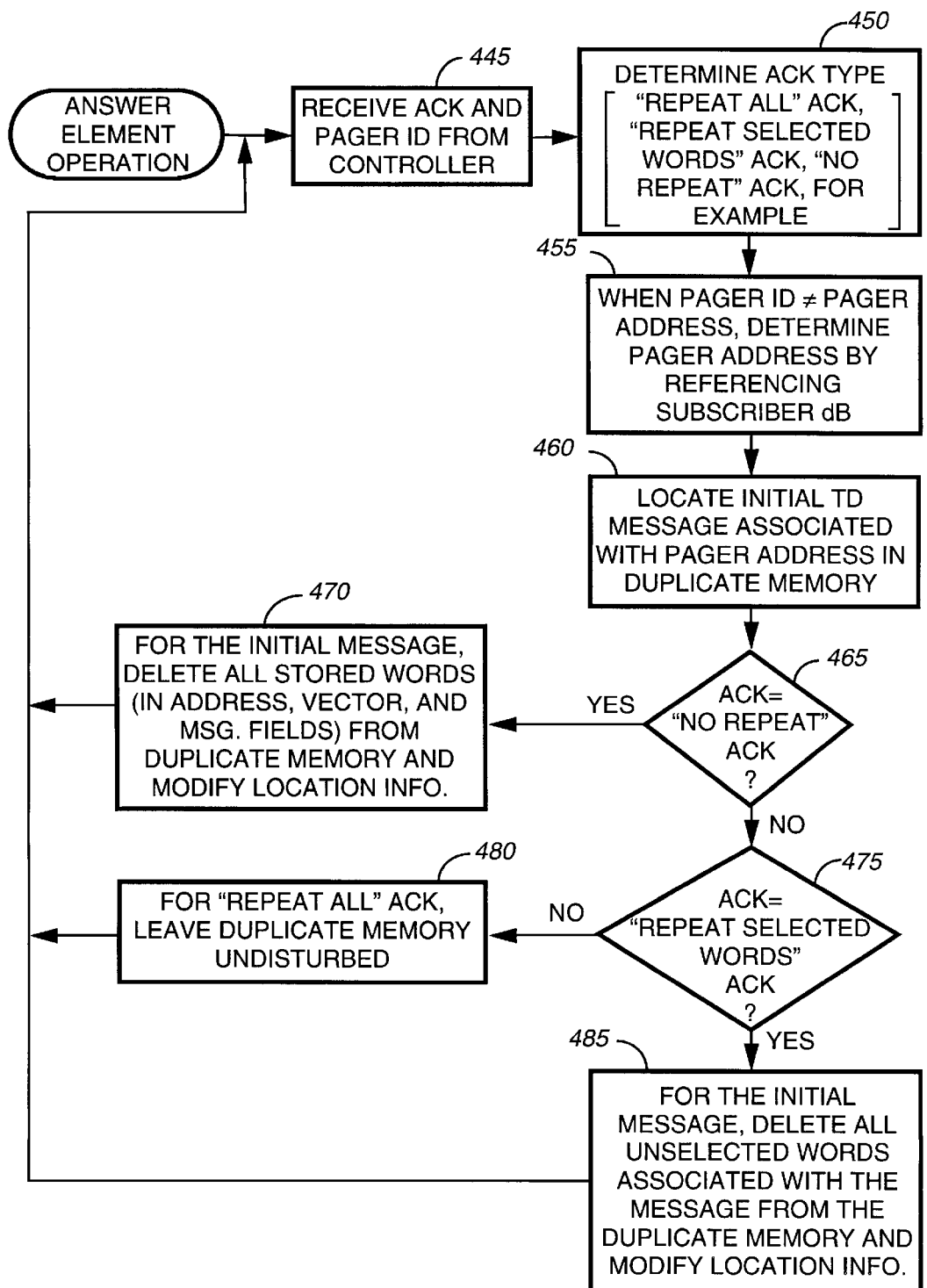
FIG. 14 is a flowchart depicting an operation of an answer element included in the terminal of FIG. 4 in accordance with the present invention.

FIG. 14 is a flowchart of an operation of the answer element 240 (FIG. 4) according to the present invention. At step 445, the answer element 240 receives an ACK and a pager ID from the controller 165. The answer element 240 then determines, at step 450, the ACK type. For instance, possible ACK types according to the present invention can comprise a "repeat all" ACK (indicating that the acknowledging pager requires retransmission of the entire initial message), a "repeat selected words" ACK (indicating that only selected words of the initial message need to be retransmitted), and a "no repeat" ACK (indicating that the pager received the message correctly, and no retransmission is necessary). It will be appreciated other ACK types can also be utilized as long as the pagers and the terminal 105 are programmed with information by which the ACKs can be recognized.

When, at step 455, the pager ID received with the ACK is not equivalent to a pager address, the pager address is determined by referencing the subscriber database 195. The initial TD message associated with the pager address is then located, at step 460, in the duplicate memory 190. When, at step 465, the ACK comprises a "no repeat" ACK, the initial information associated with the ACK is deleted, at step 470, from the duplicate memory 190. In other words, the address, vector, and message previously provided to the pager associated with the identified address are deleted. Additionally, the answer element 240 modifies the location information stored in the duplicate memory 190 to reflect the deletion of the initial information associated with the ACK.

When, at step 475, the ACK comprises a "repeat selected words" ACK, the selected words indicated by the ACK remain undisturbed in the duplicate memory 190. However, at step 485, unselected words associated with the initial information indicated by the ACK are deleted from the duplicate memory 190. The location information is also modified in accordance with the ACK. In this manner, only the words that are to be retransmitted to the acknowledging pager remain stored in the duplicate memory 190 for that pager. When, at step 480, the ACK comprises a "repeat all" ACK, the contents of the duplicate memory 190 remain undisturbed. It will be appreciated that the process described in FIG. 14 also leaves the duplicate memory 190 undisturbed when no ACK is received at all, in which case the duplicate information is retransmitted at the scheduled time.

Figure 15:
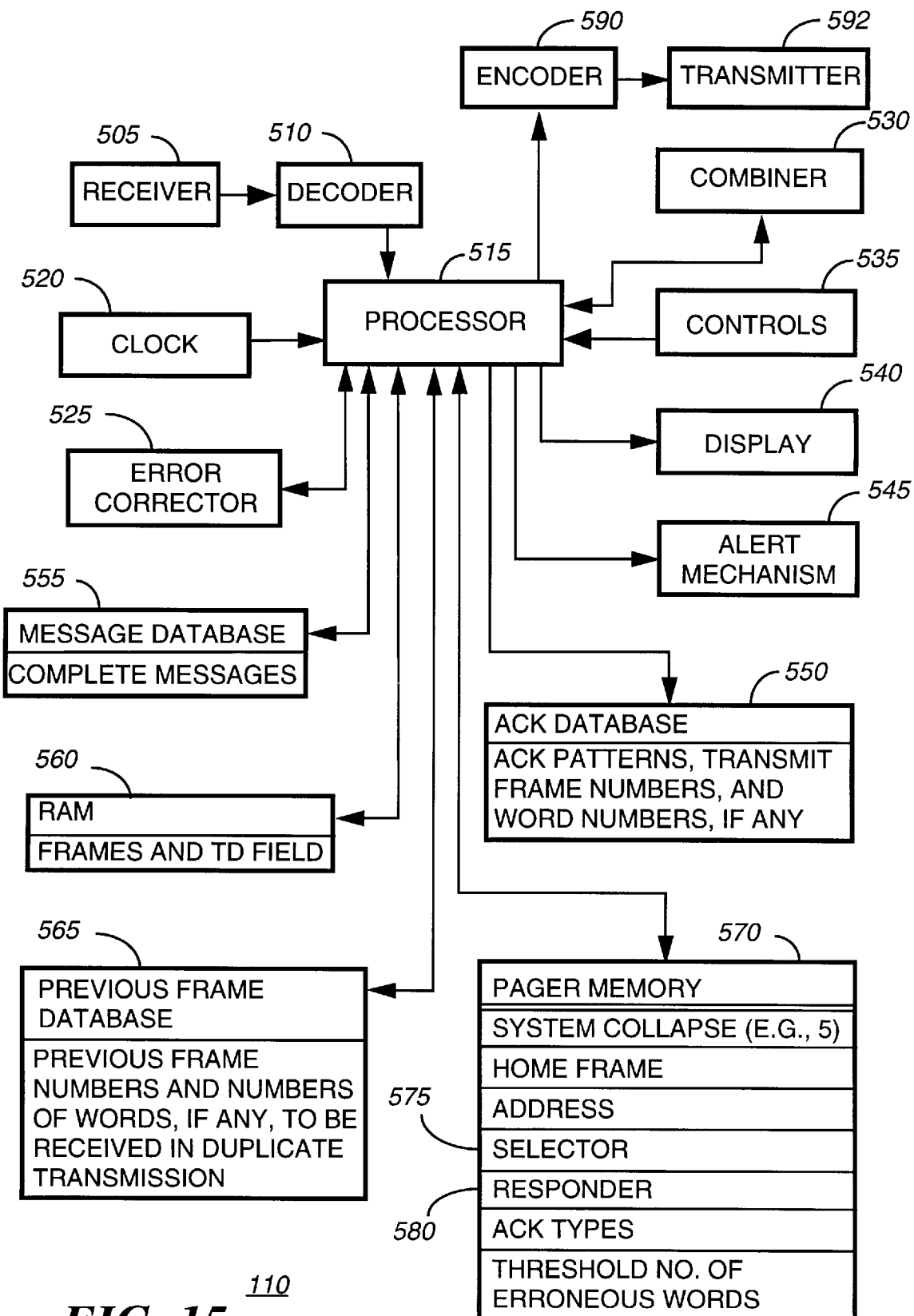
FIG. 15 is an electrical block diagram of a time diversity pager included in the communication system of FIG. 3 in accordance with the present invention.

FIG. 15 is an electrical block diagram of a TD transceiver, such as a TD pager 110, according to the present invention. The pager 110 includes receiver 505 for receiving and demodulating a radio signal, and a decoder 510 for decoding the signal to recover data bits included therein. A processor 515 coupled to the decoder 510 processes the data bits for temporary storage in a memory, such as a random access memory (RAM) 560. The processor 515 enables the receiver 505 to receive radio signals in accordance with conventional battery saving techniques by enabling the receiver 505 during frames in which the TD pager 110 can receive information and disabling the receiver 505 during other frames. The processor 515 conventionally determines the frame number by enabling the receiver 505, such as at power up, to receive a "frame number indication" transmitted by the terminal 105. Thereafter, the processor 515 can determine when to wake and sleep by referencing a clock 520 and a system collapse value. In alternative embodiments of the present invention, the pager 110 can additionally or alternatively reference a pre-programmed pager collapse value.

The TD pager 110 also comprises a pager memory 570 for storing information such as the home frame assigned to the pager 110, the address of the pager 110, and the system collapse value, which, for instance, can have an integer value of five. Additionally, the pager memory 570 preferably stores TD field markers such that the TD pager 110 can recognize delineations between TD and non-TD fields, and ACK types indicative of predetermined data patterns that can be transmitted responsive to received messages. A threshold number of erroneous words is also stored for determining the type of ACK that will be transmitted. A message database 555 is included in the TD pager 110 for storing complete messages that have been corrected by an error corrector 525 and that have, when necessary, been formed from bit combinations of initial and duplicate messages by a combiner 530 that employs conventional BCTD techniques.

Further included in the TD pager 110 are a previous frame database 565 for storing previous frame numbers and word numbers, if any, to be received in future duplicate transmissions from the terminal 105. An ACK database 550 stores ACKs that have been generated but not yet transmitted. The stored ACKs are preferably identified by "transmit frame numbers" indicative of frames in which the ACKs are to be transmitted. Word numbers associated with words that are to be retransmitted to the pager 110 are also stored in the ACK database 550.

The TD pager 110 includes controls 535 for receiving user-initiated signals and providing the signals to the processor 515. A display 540 coupled to the processor 515 displays messages, and an alert mechanism 545 generates an alert, such as an audible tone, in response to activation by the processor 515. Additionally, a selector 575 processes bits received by the processor 515 and provides the processor 515 with complete messages formed from the received bits. A responder 580 coupled to the processor 515 generates appropriate ACKs in response to message reception and stores, in the previous frame database 565, information indicating whether duplicate information is to be received in future frames. The selector 575 and the responder 580 can be, for instance, firmware that is stored in the pager memory 570. Alternatively, the selector 575 and the responder 580 can be hardwired elements capable of performing equivalent operations.

Additionally, the TD pager comprises an encoder 590 for encoding information in a paging format, such as the REFLEX™ protocol, and a transmitter 592 for transmitting the encoded information over the air to another device, such as the terminal 105 (FIG. 3).

Figure 16:
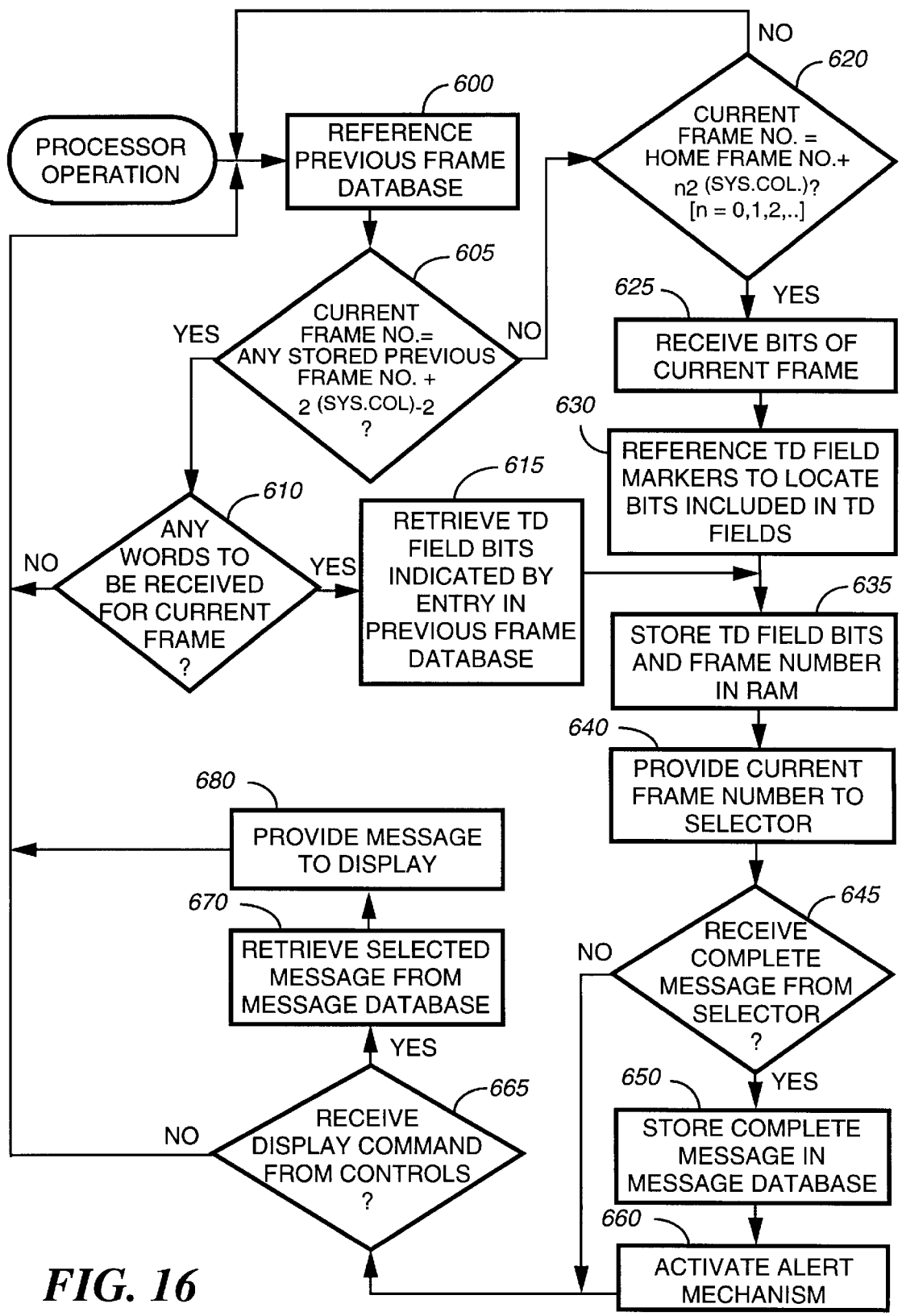
FIG. 16 is a flowchart of an operation of a processor included in the pager of FIG. 15 in accordance with the present invention.

FIG. 16 is a flowchart of an operation of the processor 515 (FIG. 15) according to the present invention. At step 600, the processor 515 references the previous frame database 565 to determine, at step 605, whether the current frame number is indicative of a frame in which duplicate information could be received. Specifically, the current frame is determined to be a duplicate frame when the following formula is satisfied:

$$\text{current frame no.} = \text{any stored previous frame no.} + 2^{sc} - 2.$$

When the current frame is a duplicate frame, the processor 515 determines, at step 610, whether any words are to be received for the current frame. When so, the TD field bits indicated by the entry in the previous frame database 565 are received, at step 615.

When the current frame is not a duplicate frame, the processor 515 further determines, at step 620, whether the current frame is an initial frame in which bits intended for the pager 110 could be transmitted. The current frame is an initial frame when current frame no.=home frame no.+$n2^{sc}$, where n=0, 1, 2, 3, . . . When, at step 620, the current frame comprises an initial frame, the bits of the current frame are received, at step 625, and the TD field markers are referenced, at step 630, to locate the bits of the incoming information that correspond to TD information.

When TD field bits are received, at steps 615, 630, the received bits are stored, at step 635, in the RAM 560, and the current frame number is provided, at step 640, to the selector 575. When, at step 645, a complete message is received from the selector 575, the complete message is stored, at step 650, in the message database 555. The alert mechanism 545 is then activated, at step 660, to announce message reception to a user of the pager 110. When, at step 665, a display command is received from the controls 535, the message selected in the display command is retrieved, at step 670, from the message database 555 and provided, at step 680, to the display 540 for presentation to the user.

Figure 17:
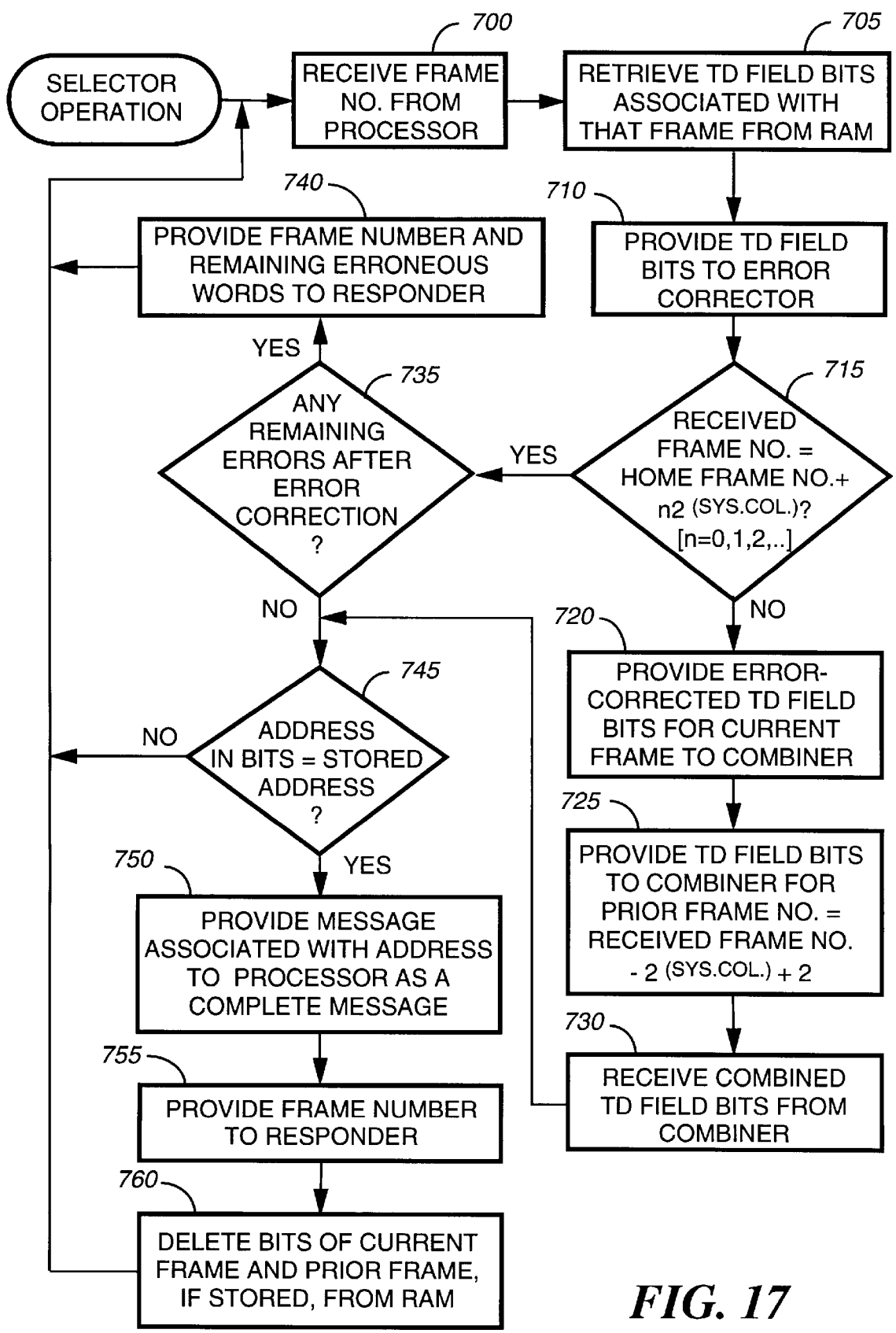
FIG. 17 is a flowchart depicting an operation of a selector included in the pager of FIG. 15 in accordance with the present invention.

Referring next to FIG. 17, a flowchart of an operation of the selector 575 is depicted. At step 700, the frame number is received from the processor 515, and the TD field bits associated with that frame number are retrieved, at step 705, from the RAM 560. Thereafter, the retrieved TD bits are provided, at step 710, to the error corrector 525 for conventional error correction. The selector 575 then determines, at step 715, whether the received frame number is indicative of a duplicate or an initial frame. The received frame number indicates an initial frame when the following formula is satisfied:

$$\text{received frame no.} = \text{home frame no.} + n2^{sc},$$

where n=0, 1, 2, 3, . . . When the received frame number is indicative of a duplicate frame, rather than an initial frame, the error-corrected bits for the current frame are provided, at step 720, to the combiner 530. The TD field bits for a previous frame, given by the formula prior frame no.= received frame no.$-2^{sc}+2$, are retrieved from the RAM 560 and also provided, at step 725, to the combiner 530. The combiner 530 preferably utilizes conventional BCTD techniques to combine the TD field bits for the current and previous frames, although it will be appreciated that other time diversity techniques, such as combining codewords, could alternatively be employed. The selector 575 then, at step 730, receives the combined bits from the combiner 530.

When, at step 715, the current frame is determined to be an initial frame, the selector 575 further determines in a conventional manner whether any errors remain in the TD field bits after error correction, at step 735. When errors remain after error correction, the frame number and remaining erroneous words are provided, at step 740, to the responder 580. When no errors remain and when, at step 745, the address indicated by the TD field bits is equivalent to the stored pager address, the message associated with the address is provided, at step 750, to the processor 515 as a complete message. The frame number is then provided, at step 755, to the responder 580, and the bits of the current and prior frames can be deleted from the RAM 560, at step 760.

In this manner, the TD pager 110 can normally wake to receive messages in initial frames, i.e., those frames in which initial information can be provided to the pager 110. However, when the pager 110 determines that a previously received message has not been received correctly, the pager 110 can conveniently wake during other frames, i.e., duplicate frames, to receive a retransmission of some or all of the initial information. Therefore, the pager 110 according to the present invention can receive duplicate information when necessary, yet still maximize battery life.

It will be appreciated that, in alternate embodiments of the present invention, the transmission of TD markers, delineating the TD fields, would be unnecessary if the pager stored all bits of the initial and duplicate frames rather than just the TD field bits. The transmission of TD markers would also be unnecessary if the pager stored only corrupted bits of data. For example, when nine out of ten addresses in a frame are correct, the pager could just store the tenth corrupted address along with the vector and message fields, in case the corrupted address corresponded to that of the pager. This would significantly reduce memory requirements when, for example, only the message, associated with an error-free address and vector, was corrupted, in which case only a relatively few corrupted bits need be stored by the pager.

Referring back to FIGS. 6–9, both TD and non-TD addresses are included in a common address field in accordance with the present invention. Additionally, TD and non-TD vectors are included in a common vector field, and TD and non-TD messages are included in a common message field. Therefore, the pager 110 does not have to be programmed to look for information in areas of the frame that are not normally utilized for providing a certain type of information.

Conversely, in prior art BCTD systems that utilize the FLEX™ protocol, TD receivers must be programmed to receive addresses, vectors, and messages in areas of the frame (FIG. 2) that are not normally utilized for the transmission of addresses, vectors, and messages. As a result, receivers that roam into the prior art system are unable to receive duplicate messages because the roamers have not been programmed to look for more than a single address, vector, and message field in each frame. In accordance with the present invention, on the other hand, system roamers can receive duplicate messages provided in the acknowledgeback communication system 100 because duplicate addresses are provided in a common address field, duplicate vectors are provided in a common vector field, and duplicate messages are provided in a common message field. This can be done without any programming exclusively for the communication system 100 because, when the pager collapse of a roaming pager is greater than the system collapse, the roaming pager will use the system collapse, as mentioned above.

Figure 18:
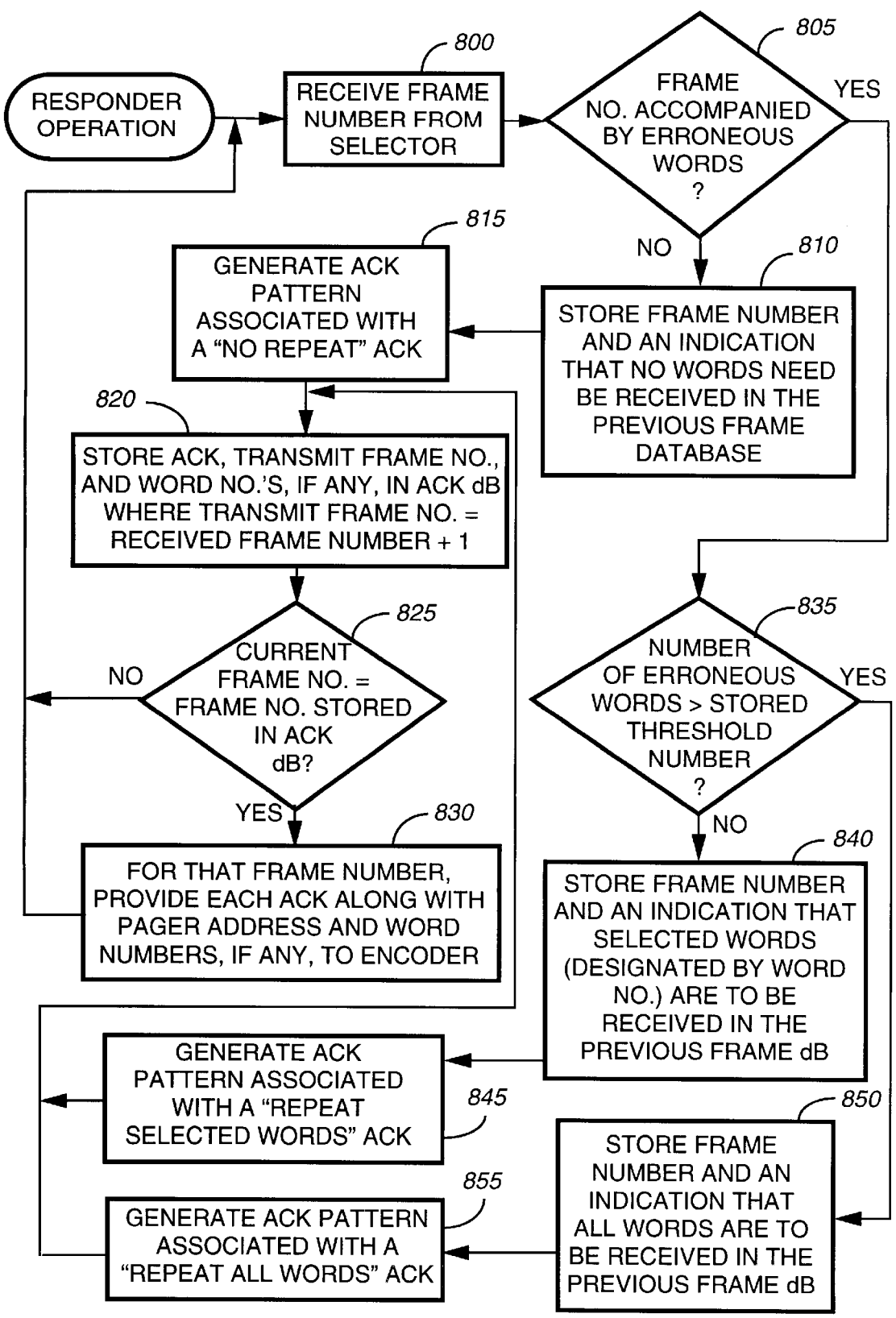
FIG. 18 is a flowchart of an operation of a responder included in the pager of FIG. 15 in accordance with the present invention.

Referring next to FIG. 18, a flowchart illustrates an operation of the responder 580 according to the present invention. At step 800, the responder 580 receives a frame number from the selector 575. When, at step 805, the frame number is accompanied by erroneous words, or by numbers indicative of erroneous words, the responder 580 determines, at step 835, whether the number of erroneous words is greater than the threshold number stored in the pager memory 570 (FIG. 15). When the number is greater than the threshold number, the frame number is stored, at step 850, in the previous frame database 565. Additionally, an indication that all words are to be received in a future duplicate frame is stored along with the frame number. Thereafter, at step 855, the responder 580 generates the predetermined data pattern associated with a "repeat all words" ACK.

When, at step 835, the number of erroneous words does not exceed the threshold number, the frame number and an indication that selected words are to be received in the future are stored, at step 840, in the previous frame database 565. The responder 580 then generates, at step 845, a predetermined data pattern associated with a "repeat selected words" ACK. When, at step 805, the received frame number is not accompanied by any erroneous words or word numbers, the frame number and an indication that no words need be received in a future duplicate frame are stored, at step 810, in the previous frame database 565. A predetermined data pattern associated with a "no repeat" ACK is then generated, at step 815.

Thereafter, at step 820, the generated ACK, a transmit frame number, and word numbers, if any, of selected words are stored in the ACK database 550 (FIG. 15). According to the present invention, the transmit frame for each stored ACK is indicative of the frame in which the ACK should be transmitted. When, for instance, the ACK is to be transmitted in the frame immediately following the frame in which a message was received, the transmit frame will be given by the formula transmit frame no.=received frame no.+1. Then, at step 825, when the current frame number is equivalent to a transmit frame number stored in the ACK database 550, the ACK associated with the transmit frame number is provided, at step 830, to the encoder 590 for transmission along with the pager ID, such as the address, and selected words, if any, to be retransmitted.

In summary, the communication system as described above includes a terminal for transmitting messages to time diversity pagers at least two times. The terminal gathers received time diversity information and queues the information for each frame into address, vector, and messages fields that also include information intended for reception by non-time diversity pagers. According to the present invention, the amount of time diversity information included in each frame varies according to the number of messages waiting to be transmitted and the number of time diversity pagers scheduled to receive information in that frame. Therefore, the system capacity available for transmission of initial messages is only reduced as necessary. Furthermore, because both the time diversity information and the non-time diversity information are transmitted in common fields, roaming pagers are able to locate the address, vector, and message fields for duplicate transmissions.

Another advantages of the communication system according to the present invention is that the frames are not restricted to a predetermined number of words for initial and duplicate information. In other words, the number of words for initial and duplicate information varies from frame to frame. Lengthy messages are therefore not automatically prohibited from being transmitted in a single frame. Subscribers in the communication system according to the present invention can receive lengthy messages without the delays or fragmentation present in prior art BCTD systems.

Furthermore, in the system according to the present invention, whether or not duplicate information is transmitted is determined by an acknowledgment provided by the transceiver. When, for instance, a transceiver has sent an ACK indicating that the initial information was correctly received, no duplicate information need be transmitted to that transceiver. As a result, words of a future frame that would otherwise have been filled with duplicate information for the transceiver can advantageously be queued with new TD information or non-TD information. This feature provides for improved efficiency over prior art BCTD systems, which transmit duplicate information regardless of whether a pager has received a message correctly.

According to the present invention, duplicate messages, when necessary, are preferably transmitted within the system collapse time. Therefore, in a system where messages are sequentially numbered, duplicate messages having a particular message number are received by a pager before the next-numbered message is transmitted by the terminal in a subsequent cycle. Situations are accordingly eliminated in which a pager receives a next-numbered message before a complete prior messages has been formed and concludes that the prior message has been missed.

It will be appreciated by now that there has been provided a method and apparatus for selectively sending duplicate transmissions without decreasing system capacity by a predetermined, fixed amount and without significantly decreasing battery life. The method and apparatus further provides for reception of duplicate messages by roaming pagers. Additionally, in a numbered messaging scheme, the pager will not erroneously conclude that a message has been missed, and lengthy messages can be received without delay.

What is claimed is:

1. A method for providing duplicate messages in a communication system including a message transmission device for sending a radio signal including the duplicate messages and transceivers for receiving the radio signal, the transeivers comprising time diversity transeivers for receiving the duplicate messages, the method comprising the steps of:

transmitting a first frame of data that has been queued with first information intended for reception by recipient time diversity transceivers, wherein the first frame includes a synchronization field followed by the first information;

receiving at least one acknowledgement from at least one recipient time diversity transceiver;

batching a second frame of data with second information intended for recipient by the at least one recipient time diversity transceiver, wherein the second frame includes a synchronization field followed by the second information, wherein the second information duplicates at least a portion of the first information as indicated by the at least one acknowledgement, and wherein bits of the second information are positioned in locations of the second frame that are equivalent to locations in which bits of the first information were queued in the first frame;

transmitting to the at least one recipient time diversity transeiver the second frame of data; and at the at least one recipient time diversity transceiver, reconstructing the first information from the second information received in the second frame by combining the first information originally received with the second information.

2. The method of claim 1, wherein the receiving step includes the step of receiving an acknowledgment from a transceiver, the acknowledgment indicating that the transceiver has correctly received a message transmitted in the first information, and that retransmission of the first messaged is not required.

3. The method of claim 2, wherein the batching step comprises the step of batching the second frame of data with the second information intended for reception by all of the recipient time diversity transceivers except for the transceiver, wherein the second information duplicates all of the first information except for the message previously transmitted to the transceiver.

4. The method of claim 1, wherein the receiving step includes the step of receiving an acknowledgment from a transceiver, the acknowledgment indicating that a previously transmitted message should be again transmitted, in its entirety, to the transceiver.

5. The method of claim 4, wherein the batching step comprises the step of batching the second frame of data with the second information intended for reception by the recipient time diversity transceivers, including the transceiver, wherein the second information duplicates the first information, including a message previously transmitted to the transceiver.

6. The method of claim 1, wherein the receiving step includes the step of receiving an acknowledgment from a transceiver, the acknowledgment requesting retransmission of selected words of a message previously transmitted to the transceiver in the first information.

7. The method of claim 6, wherein the batching step comprises the step of batching the second frame of data with the second information intended for reception by the recipient time diversity transceivers, including the transceiver, wherein the second information duplicates the selected words of the message and excludes words of the message other than the selected words.

8. The method of claim 1, wherein the queuing step comprises the steps of:
   determining whether any space is available in the second frame after the second information has been batched;
   queuing initial messages intended for reception by other time diversity transceivers in the second frame when space is available;
   determining, subsequent to queuing the initial messages, whether any further space is available in the second frame; and
   queuing messages intended for reception by non-time diversity receivers in the second frame when further space is available.

9. The method of claim 1, further comprising the step of queuing, subsequent to the batching step, third information into available words of the second frame.

10. A terminal for providing information to transceivers, the terminal comprising:
   a transmitter for transmitting a first frame of data that has been queued with first information for reception by recipient time diversity transceivers, wherein the first frame includes a synchronization field followed by the first information;
   a receiver for receiving at least one acknowledgement from at least one recipient time diversity transceiver;
   a batcher for batching a second frame of data with second information intended for reception by the at least one recipient time diversity transceiver,
   wherein the second frame includes a synchronization field followed by the second information,
   wherein the second information duplicates at least a portion of the first information as indicated by the at least one acknowledgment,
   wherein bits of the second information are positioned in locations of the second frame that are equivalent to locations in which bits of the first information were queued in the first frame, and
   a controller coupled to the transmitter, the receiver, and the batcher for controlling their operation.

11. The terminal of claim 10, wherein the at least one acknowledgment comprises an indication that a transceiver has correctly received a message transmitted in the first information, wherein the second information is intended for reception by all of the recipient time diversity transceivers except for the transceiver, and wherein the second information duplicates all of the first information except for the message previously transmitted to the transceiver.

12. The terminal of claim 10, wherein the at least one acknowledgment comprises an indication that a transceiver has requested retransmission of selected words of a messages previously transmitted to the transceiver in the first information, wherein the second information is intended for reception by the recipient time diversity transceivers, including the transceiver, and wherein the second information duplicates the first information, including the message previously transmitted to the transceiver.

13. The terminal of claim 10, wherein the at least one acknowledgment comprises an indication that a transceiver has requested retransmission of selected words of a message previously transmitted in the first information, wherein the second information is intended for reception by the recipient time diversity transceivers, including the transceiver, and wherein the second information duplicates the selected words of the message and excludes words of the message other than the selected words.

14. The terminal of claim 10, wherein the third information includes initial messages intended for reception by other time diversity transceivers when space is available in the second frame after the second information has been batched.

15. The terminal of claim 14, wherein the third information further includes messages intended for reception by non-time diversity receivers when further space is available in the second frame after the initial messages have been queued.

16. The terminal of claim 10, wherein third information is queued into available words of the second frame after the second information has been batched.

17. A communication system for providing information, the communication system comprising:
   transceivers for receiving the information and acknowledging reception of the information; and
   a terminal for transmitting the information to the transceivers, the terminal comprising:
      a transmitter for transmitting a first frame of data that has been queued with first information for reception by recipeint time divetsity transceivers, wherein the first frame includes a synchronization field followed by the first information;
      a receiver for receiving at least one acknowledgment from at least one recipient time diversity transceiver;
      a batcher for batching a second frame of data with second information intended for reception by the at least one recipient time diversity transceiver,
         wherein the second frame includes a synchronization field followed by the second information,
         wherein the second information duplicates at least a portion of the first information as indicated by the at least one acknowledgement,
         wherein bits of the second information are positioned in locations of the second frame that are equivalent to locations in which bits of the first information were queued in the first frame, and
         wherein the second information is intended for reconstructing the first information at the at least one recipient time diversity transceiver by combining the first information originally received with the second information; and
      a controller coupled to the transmitter, the receiver, and the batcher for controlling their operation.

18. The communication system of claim 17, wherein the at least one acknowledgment comprises an indication that a transceiver has correctly received a message transmitted in the first information, wherein the second information is intended for reception by all of the recipient time diversity transceivers except for the transceiver, and wherein the second information duplicates all of the first information except for the message previously transmitted to the transceiver.

19. The communication system of claim 17, wherein the at least one acknowledgment comprises an indication that a transceiver has requested retransmission of selected words of a message previously transmitted to the transceiver in the first information, wherein the second information is intended for reception by the recipient time diversity transceivers, including the transceiver, and wherein the second information duplicates the first information, including the message previously transmitted to the transceiver.

20. The communication system of claim 17, wherein the at least one acknowledgment comprises an indication that a transceiver has requested retransmission of selected words of a message previously transmitted in the first information, wherein the second information is intended for reception by the recipient time diversity transceivers, including the transceiver, and wherein the second information duplicates the selected words of the message and excludes words of the message other than the selected words.

21. The communication system of claim 17, wherein the third information includes initial messages intended for reception by other time diversity transceivers when space is available in the second frame after the second information has been batched.

22. The communication system of claim 21, wherein the third information further includes messages intended for reception by non-time diversity receivers when further space is available in the second frame after the initial messages have been queued.

23. The communication system of claim 17, wherein third information is queued into available words of the second frame after the second information has been batched.

24. In time diversity transceivers, a method for receiving first information comprising the steps of:

receiving from a radio communication system a first frame of data including first information, wherein the first frame includes a synchronization field followed by the information;

transmitting to the radio communication system an acknowledgment calling for a retransmission of at least a desired portion of the first information upon determining that the first information is corrupt;

after transmitting the acknowledgment, receiving from the radio communication system a second frame of data including second information,
wherein the second frame includes a synchronization field followed by the second information,
wherein the second information corresponds to at least the desired portion of the first information, and
wherein bits of the second information are positioned in locations of the second frame that are equivalent to locations in which bits of the first information were queued in the first frame; and reconstructing the first information from the second information by combining the first information originally received with the second information.

25. The method of claim 24, wherein the second frame of data further includes third information.

26. The method of claim 24, further comprising the step of transmitting to the radio communication system an acknowledgment indicating that the transceiver has correctly received the first information.

\* \* \* \* \*

UNITED STATES PATENT AND TRADEMARK OFFICE
CERTIFICATE OF CORRECTION

PATENT NO : 5,886,645
DATED : March 23, 1999
INVENTOR(S): Eaton

It is certified that error appears in the above-identified patent and that said Letters Patent are hereby corrected as shown below:

Please amend the claims as follows:

Column 18, line 12, delete "transeivers", and replace with --transceivers--.

Column 18, line 13, delete "transeivers", and replace with --transceivers--.

Column 18, line 35, delete "transeiver", and replace with --transceiver--.

Column 19, line 48, delete "and".

Column 19, line 48, insert new paragraph, as follows:

--wherein the second information is intended for reconstructing the first information at the at least one recipient time diversity transceiver by combining the first information originally received with the second information; and--.

Signed and Sealed this

Fourteenth Day of December, 1999

Attest:

Q. TODD DICKINSON

*Attesting Officer*  *Acting Commissioner of Patents and Trademarks*